United States Patent
Mahoney

[11] Patent Number: 5,553,367
[45] Date of Patent: Sep. 10, 1996

[54] METHOD FOR REPAIRING A MACHINE HAVING A SUPPORT STRUCTURE AND WORN COMPONENTS

[75] Inventor: John P. Mahoney, Milwaukee, Wis.

[73] Assignee: Harnischfeger Corporation, Brookfield, Wis.

[21] Appl. No.: 300,753

[22] Filed: Sep. 6, 1994

[51] Int. Cl.⁶ ........................................ B23P 6/00
[52] U.S. Cl. .................... 29/402.08; 29/402.12; 29/402.15; 29/402.17; 29/893.2; 74/448
[58] Field of Search ............... 29/402.03, 402.08, 29/402.12, 402.14, 402.15, 402.17, 893, 893.2; 74/448

[56] References Cited

U.S. PATENT DOCUMENTS

| | | | |
|---|---|---|---|
| 3,273,232 | 9/1966 | Royer | 29/893 X |
| 3,439,551 | 8/1969 | Militana | 74/448 X |
| 3,742,779 | 7/1973 | Shaver | 74/448 |
| 3,888,357 | 6/1975 | Bauer et al. | 212/68 |
| 3,972,106 | 8/1976 | Orr | 29/893 |
| 4,126,922 | 11/1978 | Eagens | 29/402.12 |
| 4,478,340 | 10/1984 | Delago | 212/253 |
| 4,622,860 | 11/1986 | Cametti et al. | 74/448 |
| 4,924,581 | 5/1990 | Jakobsen | 29/402.08 X |
| 5,279,173 | 1/1994 | Blaszynski et al. | 74/448 |
| 5,289,733 | 3/1994 | Kallenberger | 74/448 X |
| 5,347,880 | 9/1994 | Kallenberger | 29/402.08 X |

FOREIGN PATENT DOCUMENTS

1346890A 10/1987 Switzerland.

Primary Examiner—S. Thomas Hughes
Attorney, Agent, or Firm—Jansson & Shupe, Ltd.

[57] ABSTRACT

The disclosure involves a structural combination and a method for attaching a machine component such as a number of arc-shaped gear segments to a supporting segment mounting pad. As new, each gear segment is furnished with a number of openings, all of the same diameter. Initially, the mounting pad is free of openings and each gear segment is placed on the pad and used as a drilling template. After openings are drilled in the mounting pad, a number of such openings (but not all) are "opened up" by reaming and a bearing-fit bolt is inserted into the reamed openings. In repair, a new gear segment is placed at a position which spans two places formerly occupied by gear segments. Certain openings in the new segment are aligned with existing openings in the mounting pad (to receive clearance-fit bolts therethrough) and other segments openings are used to form new openings in the mounting pad.

6 Claims, 8 Drawing Sheets

METHOD FOR REPAIRING A MACHINE HAVING A SUPPORT STRUCTURE AND WORN COMPONENTS

FIELD OF THE INVENTION

This invention relates generally to machinery and, more particularly, to machine assembly and to later repair of such machine.

BACKGROUND OF THE INVENTION

Many types of machines are assembled using such common components as motors, drive shafts, bearings and gears. Mobile machines (machines capable of self-propelled travel) including particular types thereof are no exception. Mobile machines are used for earthmoving, excavating and, in the case of open-pit mining, to remove overburden and expose the valuable mineral or ore beneath such overburden. A dragline, a particular type of mobile machine, is usually used for open-pit mining.

In a smaller machine, "unitary" components are used in assembly. As used in this specification, a unitary component is formed as a single piece, i.e., a complete shaft, gear or the like.

An example of how unitary gear components are used to make a crane swing drive appears in U.S. Pat. No. 4,478,340 (Delago). The bull gear or circle gear shown in FIG. 3 of the Delago patent is made as a single piece. The "upper works" of the crane is caused to rotate on the truck-like chassis by a pinion gear engaged with the circle gear.

However, as machine size increases, it becomes progressively more impractical to make some components as unitary components. In a very large machine, such components would be all-but-impossible to make—machine tools of suitable size either do not exist or are not readily available. And in any event, such a component would be unwieldly to handle.

A specific example involves the swing drive of a large digging machine. If the machine is relatively large, the swing drive will probably have drive components which are "segmented," i.e., made in several pieces. The components shown in FIG. 2 of U.S. Pat. No. 3,888,357 (Bauer et al.) and in FIGS. 3 and 4 of U.S. Pat. No. 4,622,860 (Cametti et al.) are examples.

In the manufacture of large draglines such as shown in U.S. Pat. No. 5,320,431 (Kallenberger), it has been the practice to provide the swing "rack" or bull gear as a number of arc-like gear segments. Such segments are placed end-to-end to form the gear circle and the segments are then mounted on the segment support structure or "tub" as it is often called. Mounting is by welding each segment to the support structure. (The magnitude of the gear fabrication and mounting problem will be better appreciated by understanding that the swing rack on a large dragline may have a diameter of 15–20 feet or more and weight several tons.)

A circular rail is mounted atop the assembled swing rack and bearings supporting the upper, rotating part of the dragline ride on such rail. In cross-section, such rail resembles a railroad-type rail with its outwardly-extending flanges for mounting. Rail mounting is by clearance-fit clip bolts which hold a flange-clamping clip against the rail. Such clip bolts extend through apertures in the gear segment and in the support structure.

While the gear segment mounting arrangement described above has been generally suitable, it is not without its problems. A significant disadvantage arises from the fact that draglines (as well as other types of mobile machines) are subjected to a good deal of mechanical abuse and "shock" loading.

Welds are rather brittle and the welds holding a gear segment to the support structure develop cracks and fail. The gear segment formerly secured by the failed welds must immediately be replaced or at least re-attached as the swing drive cannot be operated with even one non-functional gear segment. If worn or detached segments are to be replaced with new, the common practice is to place a new segment at a specific place formerly occupied by the worn or detached segment and then weld such new segment in place.

And the clip bolts are of little value in preventing weld cracking. Such clip bolts, being of the clearance-fit type, do not prevent slight, momentary radial shifts in position of a gear segment as a shock load is imposed on such segment. It is the slight radial shifts that cracks welds. Further, bolts are commonly used (and are intended to be used) as "tension" or clamping devices. That is, they depend for their clamping holding power upon being stretched slightly as the nut is tightened.

Broken welds and resulting machine downtime (which, with the advent of the invention, is unnecessary) translate into machine operating costs. Very clearly, a reduction in machine operating costs benefits the seller, the buyer and in the case of a dragline, those purchasing products made from the mineral being mined.

An improvement in the way a machine component such as a gear segment is mounted on a support structure would be an important advance in the art.

OBJECT OF THE INVENTION

It is an object of the invention to provide a new apparatus and method for mounting a machine component on a support structure which overcomes some of the problems and shortcomings of the prior art.

Another object of the invention is to provide a new apparatus and component mounting method which avoids using welds as the primary means of mounting a machine component on a structure.

Another object of the invention is to provide a new apparatus and component mounting method which provides improved endurance and reduces failures and downtime.

Yet another object of the invention is to provide a new apparatus and component mounting method which lend themselves well to new machine assembly and to field repair. How these and other objects are accomplished will become apparent from the following descriptions taken in conjuction with the drawing.

SUMMARY OF THE INVENTION

The invention involves mounting a machine component to a support structure using bolts and also involves replacing a worn component with a new component attached by bolts. The following information will be helpful when analyzing this specification.

"Clearance fit" bolts are (as the name suggests) bolts which fit through an opening with slight clearance between such bolt and opening. Typically, a clearance-fit bolt may be readily inserted into and removed from its opening without the use of force.

On the other hand, "bearing fit" bolts are bolts which fit very snugly into an opening. Usually, such bolts and related openings have a "line-to-line" fit or an interference fit (the bolt is very slightly larger than the opening). Some force must be used to insert a bearing-fit bolt into its opening.

As used in this specification, the term "aperture" means an opening receiving or which could receive a clearance-fit bolt. The term "hole" means an opening receiving a bearing-fit bolt.

The first part of this summary relates to the invention as used primary to initially assemble the component to the structure. The second part of the summary relates to the invention as used for later replacement of a worn component.

An aspect of the invention involves the combination apparatus of a support structure such as a dragline tub and a machine component such as a gear segment to be mounted on such structure. The component has a group of apertures which are preferably formed by drilling.

In the improvement, the component has a group of holes and the support structure has a plurality of holes therethrough. Each of the holes in the component is in registry with a different hole in the support structure and a hole in the component and a hole in the support structure are formed substantially simultaneously. Preferably, such holes are reamed holes so that the diameters of the holes are substantially equal to one another. A bearing-fit bolt extends through both reamed holes.

In a method for attaching the machine component to the support structure, the component includes a first group of apertures, each for receiving a clearance-fit bolt therethrough. In the improvement, the component also includes a second group of apertures and the method includes the steps of drilling a plurality of pilot openings in the support structure, each pilot opening being generally aligned with an aperture of the second group.

The pilot openings and the apertures aligned therewith are then enlarged slightly (preferably by reaming them) to form aligned holes and a bearing-fit bolt is extended through the holes. Preferably, the drilling step is preceded by the step of placing the component on the support structure and using such component as a drilling template.

And the invention is also useful for replacing a worn component in a machine having worn components at each of first and second places on the support structure. In certain aspects of the method described below, holes formerly receiving a bearing-fit bolt are used in repair to receive a clearance-fit bolt. And new holes are formed by reaming using apertures in the support structure and the component.

The method includes the steps of removing the worn components from the first and second places. A new component is then positioned at a site spanning the first and second places and the new machine component is attached at the site. To put it another way, the position of a new component is "indexed" slightly from a place previously occupied by a worn component.

More specifically, the support structure includes plural apertures at the first and second places. The new component includes first and second groups of apertures and the placing step includes positioning the new component so that at least one aperture in the first group of apertures of the new component is in registry with an aperture at the first place to thereby form what is referred to as a first set of apertures. Positioning is also so that at least one aperture in the second group of apertures is in registry with an aperture at the second place to form a second set of apertures.

The attaching step includes reaming the first set of apertures to form a first set of holes and extending a bearing-fit bolt through such first set of holes. Preferably, such step also includes extending a clearance-fit bolt through the second set of apertures.

Because the worn components were held in place in part by bearing-fit bolts, the support structure also includes plural holes at the first place and plural holes at the second place. The new component includes first and second groups of apertures and, preferably, includes only apertures and each such aperture has a diameter slightly less than that of a hole. The placing step includes positioning the new component so that at least one aperture in the first group of apertures of the new component is in registry with a hole at the first place. Preferably, such step also includes new-component positioning so that at least one aperture in the second group of apertures is in registry with a hole at the second place.

The attaching step includes extending a clearance-fit bolt through the aperture in the first group and the hole at the first place. Preferably, such step also includes extending a clearance-fit bolt through the aperture in the second group and through the hole at the second place.

Further details of the invention are set forth in the following detailed description and in the drawing.

DETAILED DESCRIPTION OF PREFERRED EMBODIMENTS

The invention is described in conjunction with a walking dragline 10. Before describing the invention, it will be helpful to have an understanding of some aspects of such a dragline 10.

Figure 1:
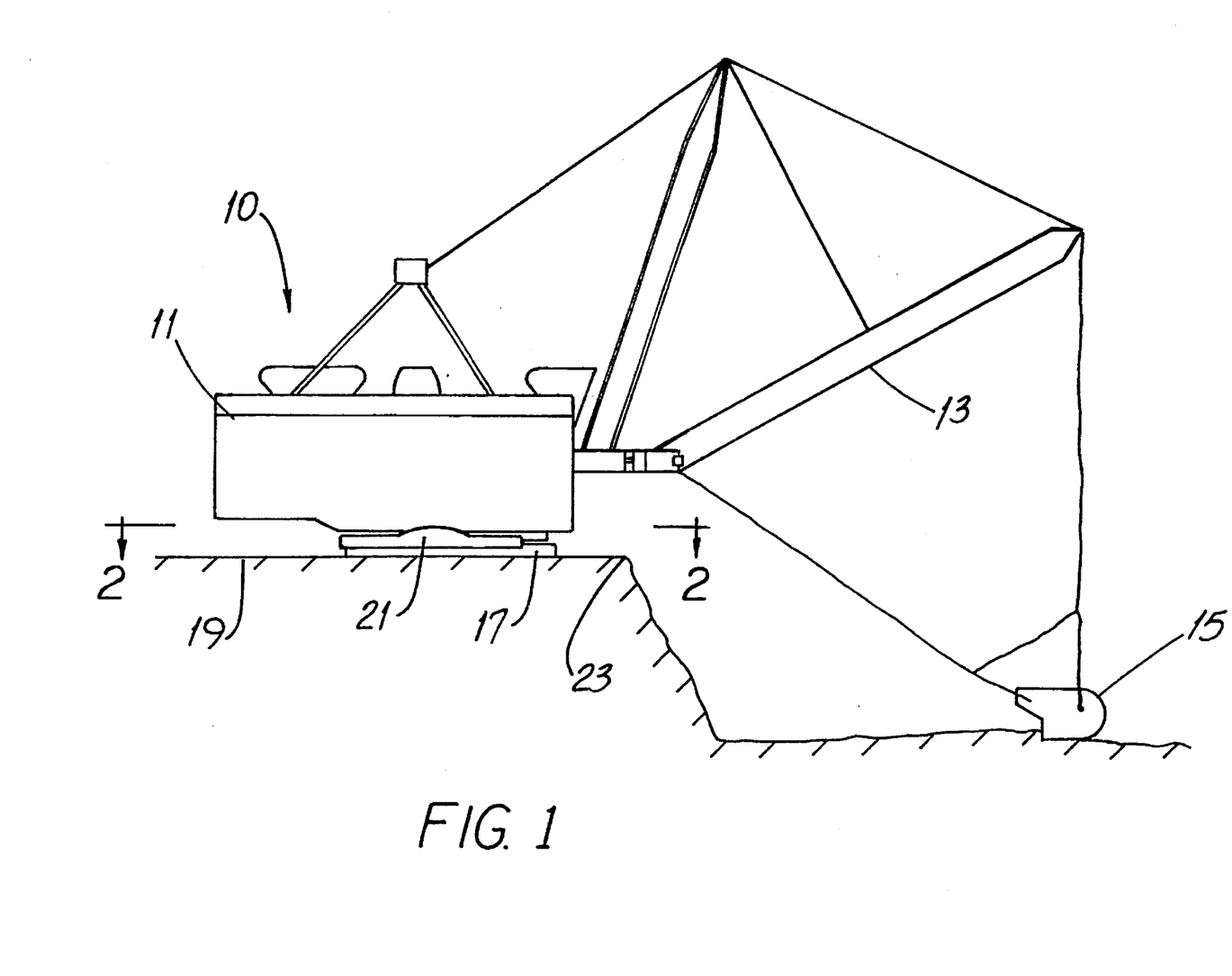
FIG. 1 is a representative side elevation view of a dragline.

Referring first to FIG. 1, and exemplary walking dragline 10 includes a main housing portion 11 having a boom 13 extending therefrom to support and manipulate a digging bucket 15. Within the housing portion 11 are mounted the bucket hoist, bucket drag and swing systems, respectively. The drive for the "walking" system is also mounted therein. When digging, the dragline 10 is supported by and pivots about a generally circular platform or "tub" 17 which rests on the earth's surface 19.

The dragline 10 also includes a pair of pads or "shoes" 21 which, when moved in unison as described below, lift the tub 17 from the surface 19 and move the dragline 10 rearward away from the bucket 15. Since the bucket 15 is drawn toward the dragline 10 during digging, removal of overburden progresses toward the dragline 10 until the edge 23 of the pit becomes relatively near to the dragline 10. Therefore, the dragline 10 must occasionally be moved rearward a few feet to expose additional overburden for digging.

Dragline "walking" movement is by driving the eccentric through one revolution. As the eccentric is driven, the shoes 21 are lowered to ground contact and the dragline 10 lifted and moved rearward. The shoes 21 are then raised until the tub 17 again rests on the surface 19.

Figure 2:
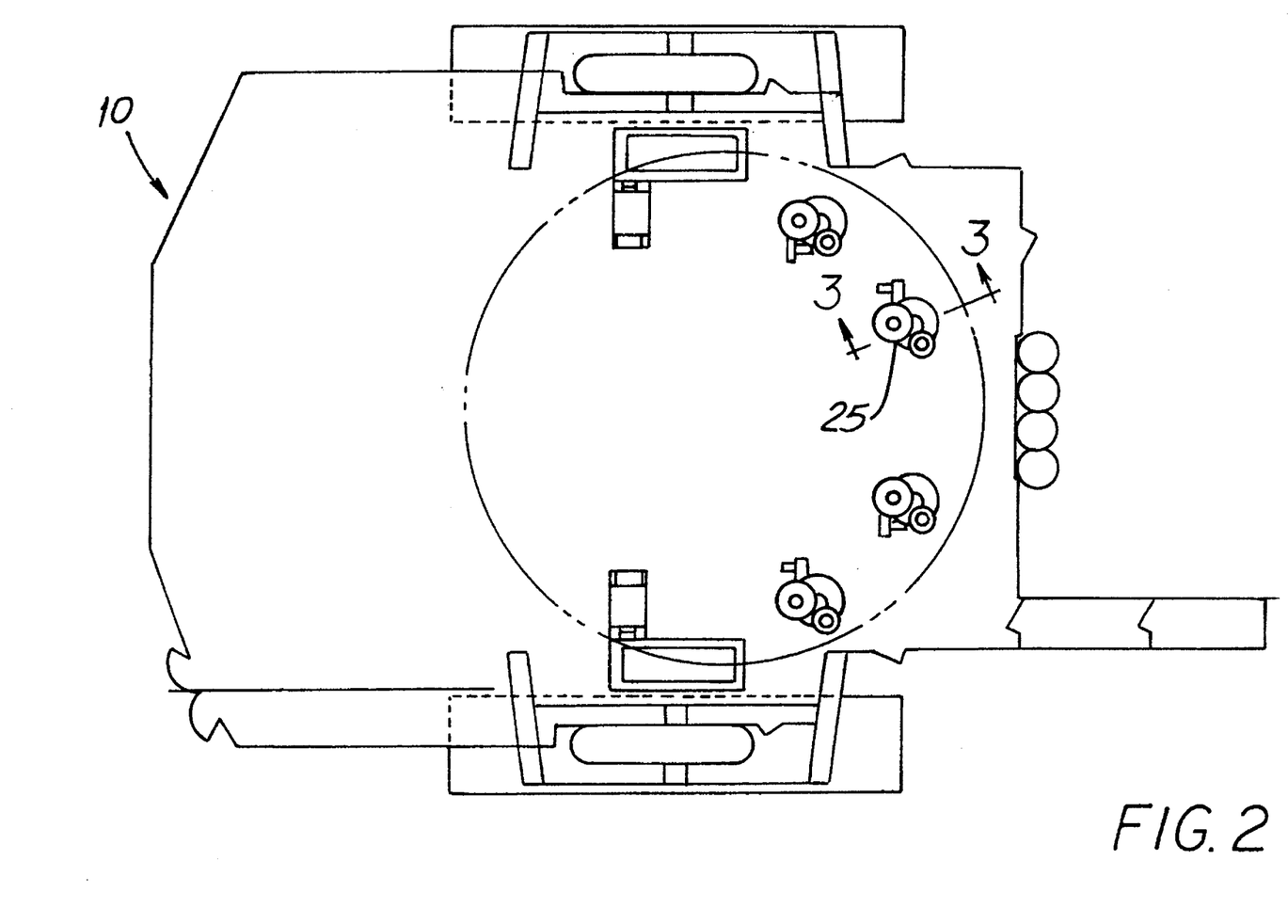
FIG. 2 is a top plan view of a portion of the dragline of FIG. 1 taken generally along the viewing plane 2—2 of FIG. 1.
Figure 3:
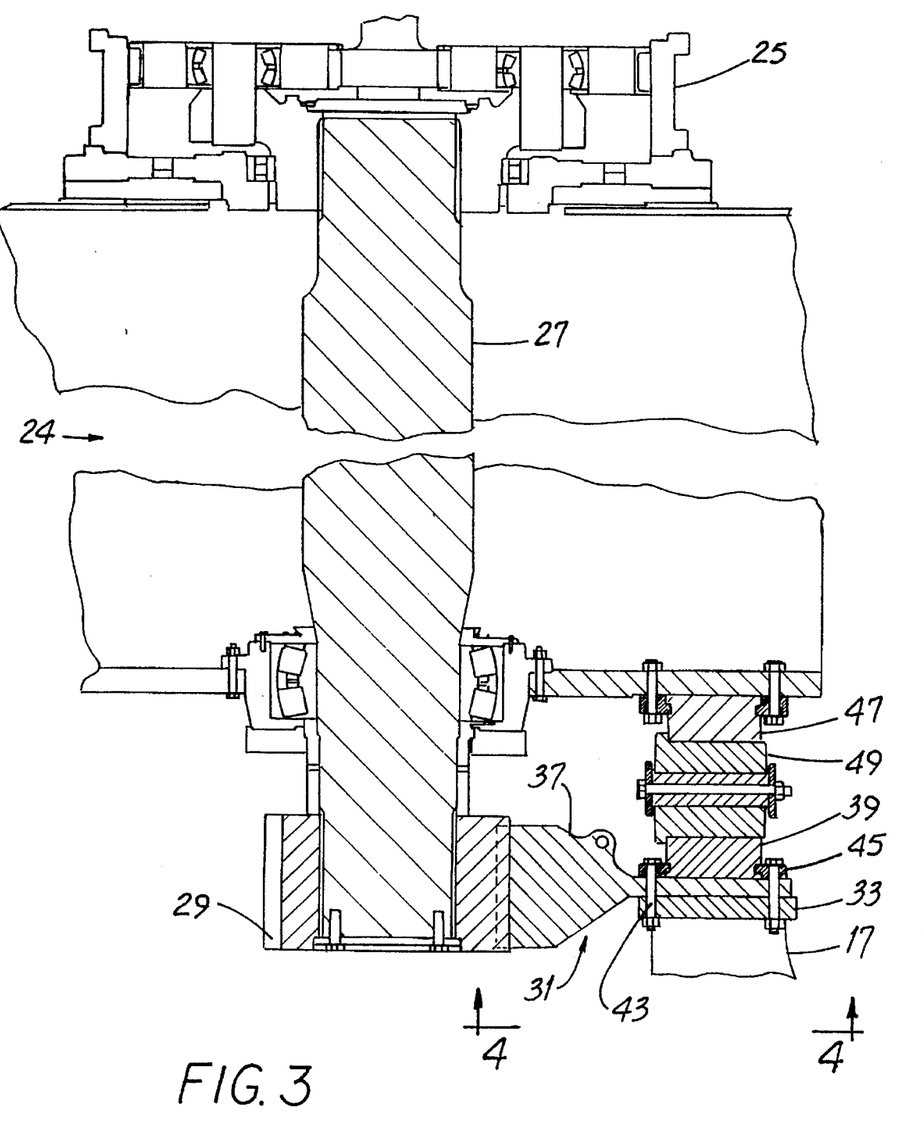
FIG. 3 is a representative side elevation view of a portion of a swing drive taken generally along the viewing plane 3—3 of FIG. 2. Parts are broken away and certain crosshatching is omitted for clarity.
Figure 4:
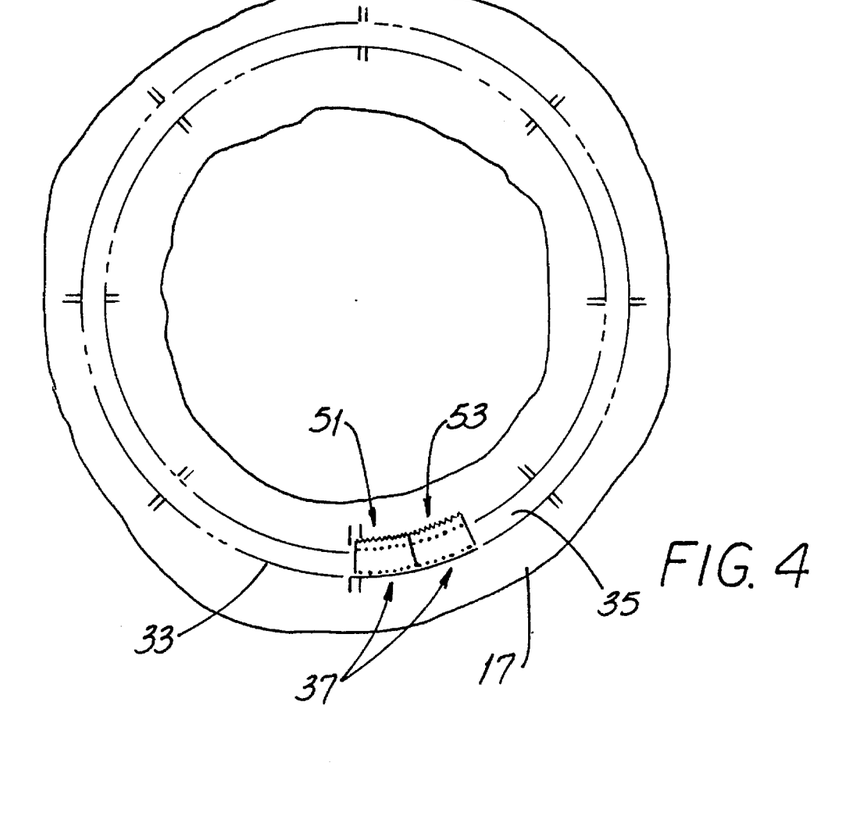
FIG. 4 is a top plan view of a dragline segment mounting pad with two arc-like gear segments placed thereon. Parts are broken away and other parts are shown in dashed outline.

Referring also to FIGS. 2, 3 and 4, rotation of the dragline 10 "upper works" e.g., housing portion 11 is by a swing drive 24 involving one or more vertically-mounted electric motors 25. Each electric motor 25 is coupled to one end of a drive shaft 27, the other end of which is fitted with a pinion gear 29. Such gear 29 engages the circular swing rack gear 31 to rotate the housing portion 11 with respect to the tub 17.

Figure 5:
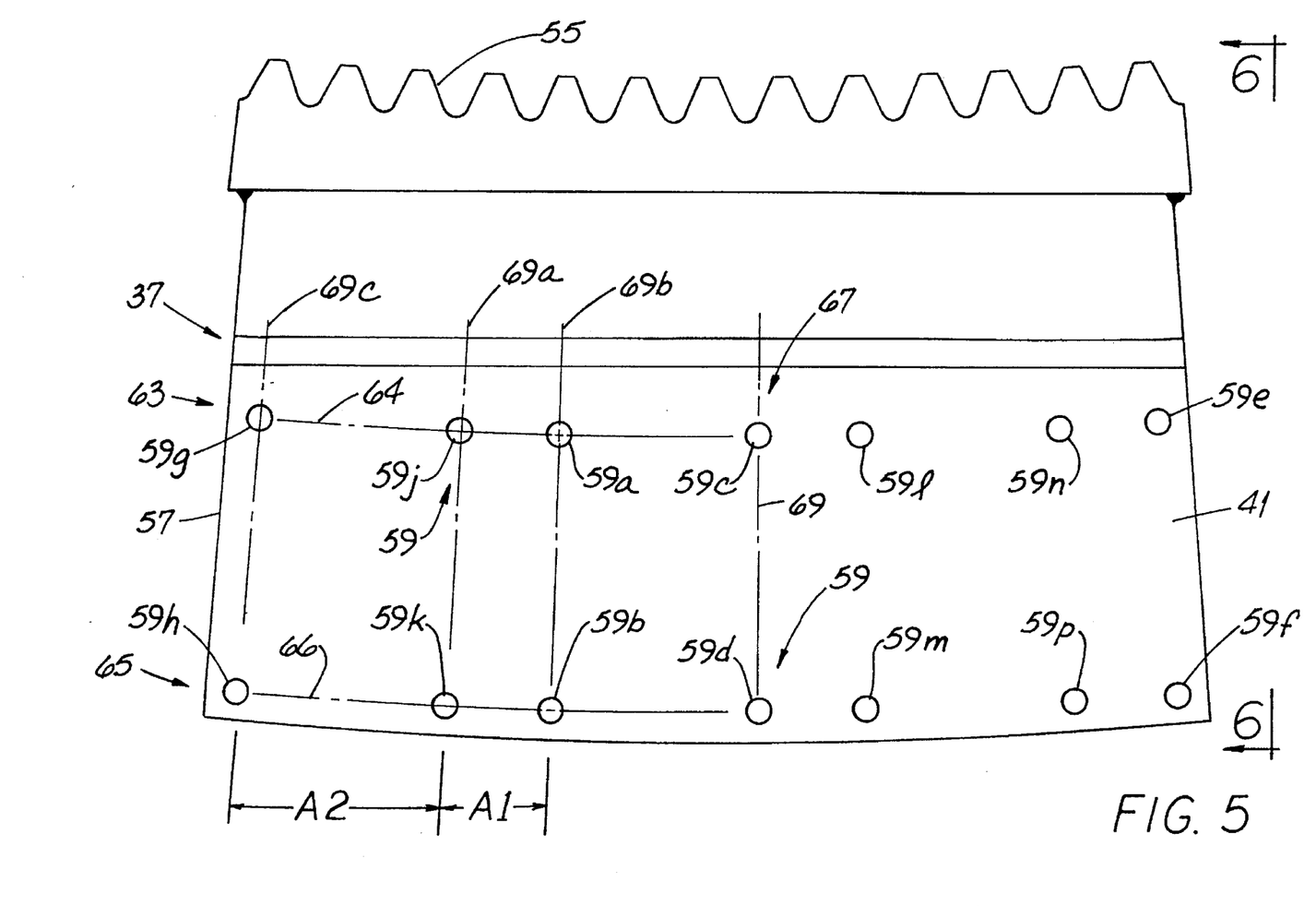
FIG. 5 is a top plan view of a gear segment used to assemble the swing drive "rack" of the dragline of FIG. 1.
Figure 6:
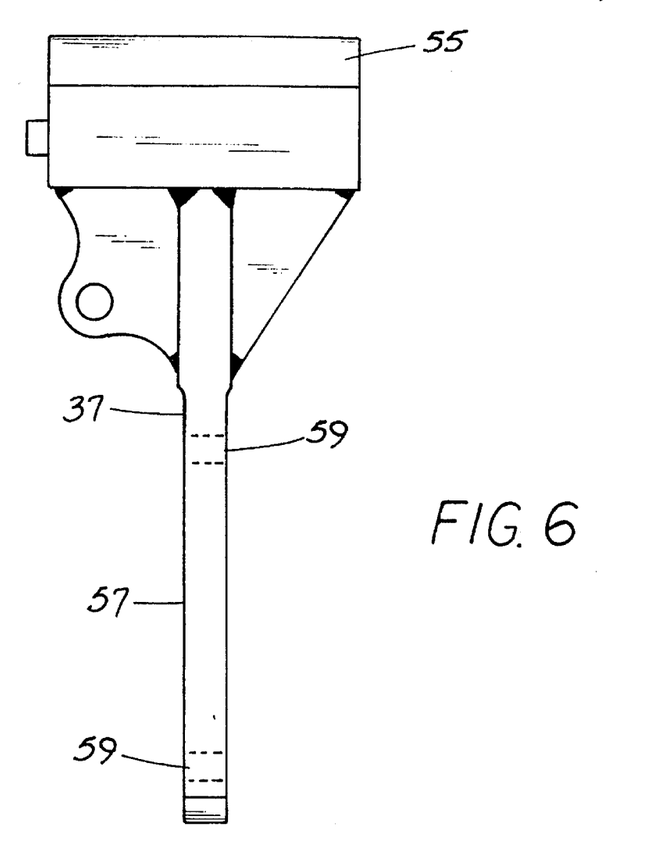
FIG. 6 is an edge view of the gear segment of FIG. 5 taken generally along the viewing plane 6—6 of FIG. 5.

Specific details of the invention will be set forth following a description of the general arrangement of other aspects of the swing drive 24. Referring also to FIGS. 5 and 6, the supporting tub 17 includes a ring-like tub mounting pad 33 having a substantially flat surface 35. Machine components embodied as arc-shaped gear segments 37 are mounted atop the pad 33 (in a manner described below) and the swing rail 39 is placed on the top surfaces 41 of the segments 37 and held there by clearance-fit bolts 43 and rail retaining clips 45. The underside of the dragline upper works (including portion 11) is fitted with a similar rail 47 and a roller bearing set 49 is interposed between the rails 39 and 47. FIG. 4 shows two gear segments 37 mounted on the pad 33, one each at first and second places 51 and 53, respectively.

Considering FIGS. 5 and 6, each gear segment 37 has machined teeth 55 and a segment mounting portion 57. In a highly preferred embodiment, each mounting portion 57 has a plurality of apertures 59 drilled therein and in one specific embodiment, such apertures 59 have a diameter of about 1.56 inches. Apertures 59 of that size can receive a clearance-fit bolt 43 having a diameter of about 1.50 inches. (Considering FIG. 11 also, it is to be noted that with an aperture 59 and a bolt 43 sized as mentioned above, there is an annular clearance 61 between the bolt 43 and the aperture 59 of about 0.03 inches—[1.56 minus 1.50] divided by 2—measured radially.)

Apertures 59 comprising the inner arc-like row 63 are on a common bolt circle 64 while apertures 59 comprising the outer row 65 are on another common bolt circle 66 of slightly larger diameter. Further, the apertures of each line 67 of apertures 59 are on a common radial 69. The radials 69*a* and 69*b* define an angle "A1" therebetween while the radials 69*a* and 69*c* define an angle "A2" therebetween. In the specific illustrated embodiment, the angles A1 are 1° while the angles A2 are 20°.

It is to be appreciated that prior to initial assembly of the swing rack gear 31, the tub mounting pad 33 is imperforate, i.e., is free of openings. And each gear segment 37 is fabricated with the illustrated apertures 59 (FIG. 5) so that such segment 37 is ready for assembly. As will become apparent, each gear segment 37 is used as a template during segment mounting. Specifically, the apertures 59 in such segment form the pattern for drilling and reaming.

For purposes of describing the new method, the apertures 59 are identified into two groups. The first aperture group includes apertures 59*a*, 59*b*, 59*c*, 59*d*, 59*e* and 59*f* (six in all) while the second aperture group includes apertures 59*g*, 59*h*, 59*j*, 59*k*, 59*l*, 59*m*, 59*n* and 59*p* (8 in all).

Figure 12:
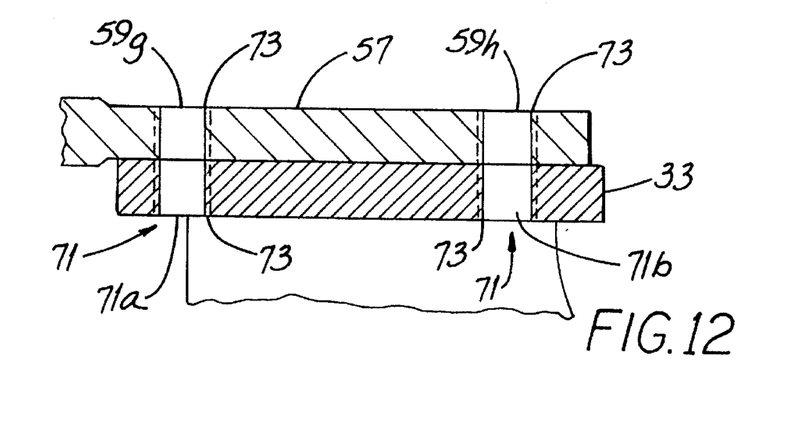
FIG. 12 is a view generally like those of FIGS. 9 and 11 showing how a pilot opening and an aperture are opened up to a hole. Opening, aperture and hole diameter differences are exaggerated for purposes of explanation.

In practicing the new method, the segment 37 is placed on the tub pad 33 so that such segment 37 serves as a drilling template. Referring also to FIG. 12, a plurality of pilot openings 71 is then drilled in the support structure, i.e., the pad 33, and each pilot opening 71 is drilled using the aperture 59 immediately thereabove as a drill "locator." Each pilot opening so drilled is, of course, generally aligned with a particular, different aperture 59 in the second group.

Referring particularly to FIGS. 5 and 12, as an example, it is assumed that the segment 37 is placed on the pad 33 as in FIG. 12. The apertures 59*g* and 59*h* are then used as a "template" to drill pilot openings 71*a* and 71*b*, respectively, in the pad 33. That is, a drill is inserted down through, e.g., aperture 59*g* and the pilot opening 71*a* is drilled as the drill is guided by aperture 59*g*.

Figure 9:
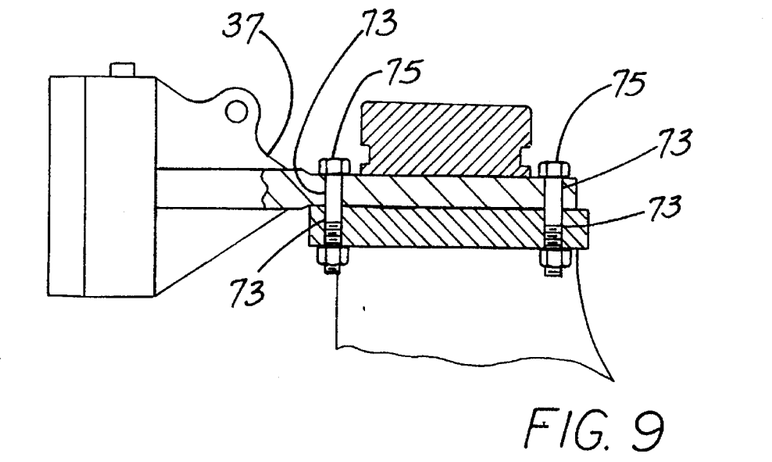
FIG. 9 is a side elevation view, partly in section, showing how a gear segment is held on the mounting pad using bearing-fit bolts.

Referring also to FIG. 9 the pilot openings e.g., openings, 71, 71*b* and the apertures of the second group which are aligned therewith, e.g., apertures 59*g* and 59*h*, respectively, are then enlarged slightly (preferably by reaming them) to form holes 73 and a bearing-fit bolt 75 is extended through the holes 73. In FIG. 12, the difference in diameter between the apertures 59*g*, 59*h* and pilot openings 71*a*, 71*b* on the one hand, and the later-formed "opened-up" holes 73 on the other hand are exaggerate for illustrative purposes.

In a specific embodiment, the holes 73 are formed by reaming them to a diameter of about 1,623 inches. Such holes 73 can receive a bearing-fit bolt having a diameter of about 1.623 to 1.625 inches. (It is to be noted that with a hole 73 and a bolt 75 sized as mentioned above, there is no clearance between the bolt 75 and the holes 73 and, in fact, the bolt 75 will likely have to be forced through the holes 73.)

Figure 7:
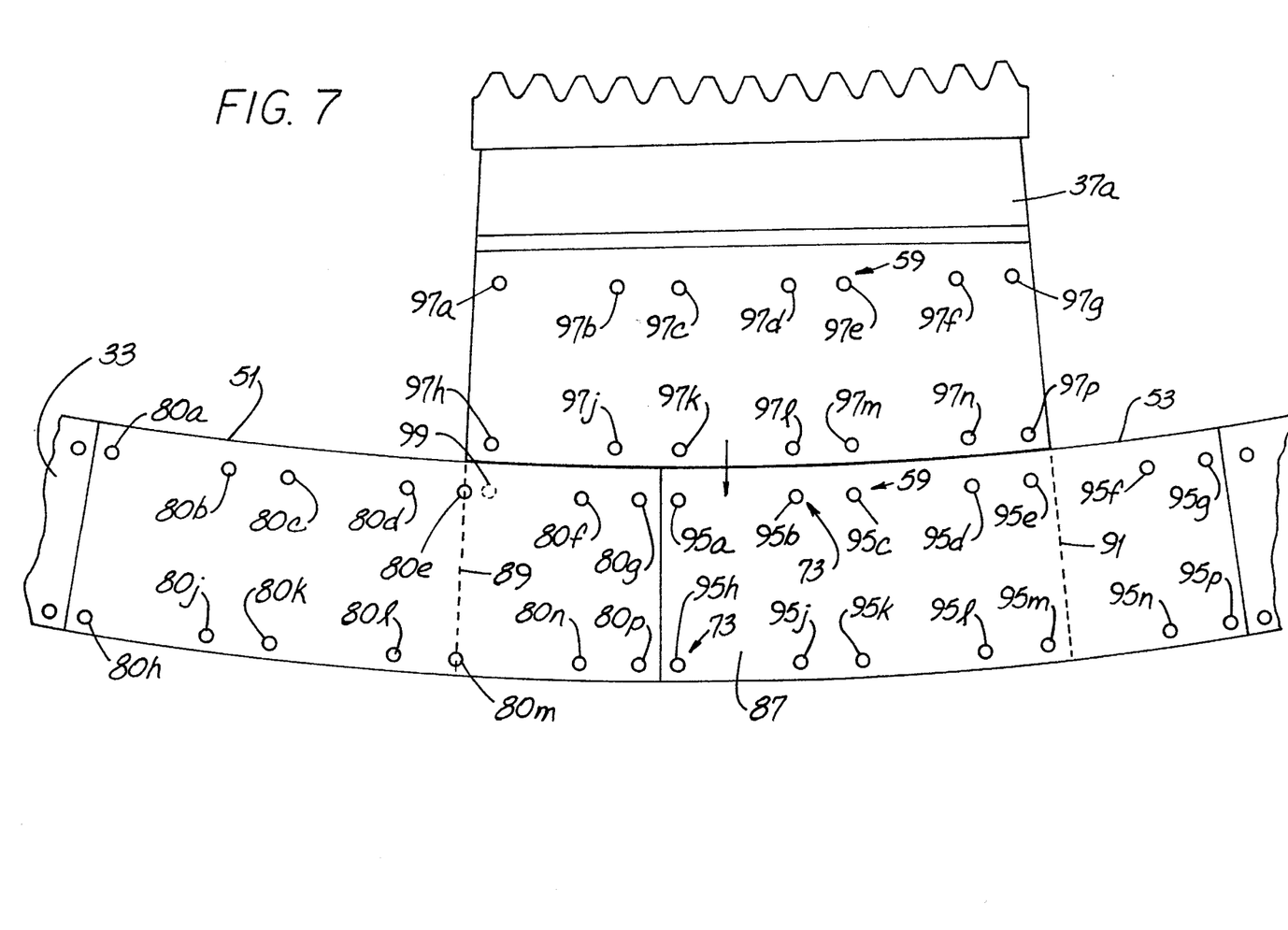
FIG. 7 is a top plan view of a portion of the mounting pad shown in FIG. 4 shown in conjunction with a gear segment.
Figure 8:
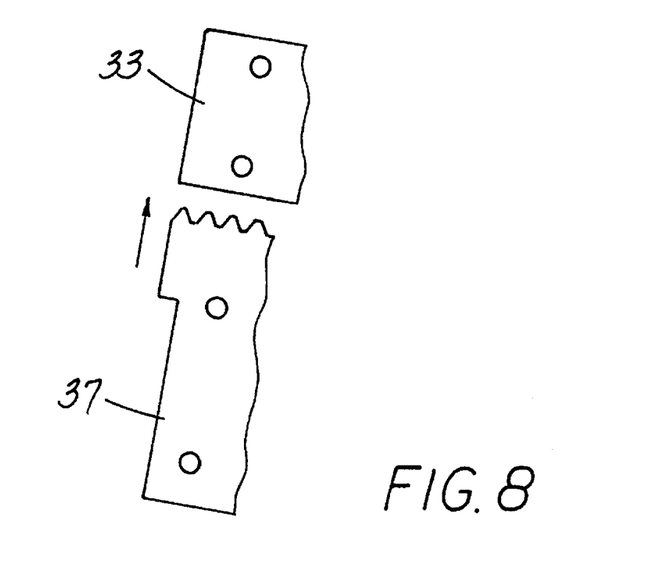
FIG. 8 is a top plan view showing generally how a gear segment is placed on the mounting pad. Parts are broken away.

Understanding of the new method will be further aided by reference to FIG. 7. The tub mounting pad 33 has first and second places 51 and 53, respectively. (It will be recalled that at the start of assembly, the mounting pad 33 is free of holes 73 and apertures 59. FIG. 7 illustrates the mounting pad 33 after such apertures 59 and holes 73 are formed. While mounting a segement 37 at each of the places 51, 53. The above-stated definitions of an aperture 59 and a hole 73 should also be recalled.)

The foregoing will now be explained in a different way. In FIG. 7, all of the openings in the pad 33 at the first place 51 are given a location designation, i.e., locations 80*a*, 80*b*, 80*c*, 80*d*, 80*e*, 80*f*, 80*g*, 80*h*, 80*j*, 80*k*, 80*l*, 80*m*, 80*n* and 80*p*. Referring also to FIG. 5, when a segment 37 is first being mounted on an opening-free pad 33, aperture 59*g* is at location 80*a*, aperture 59*n* is at location 80*f* and so forth.

After such initial placement of the segment 37, apertures are drilled in the pad 33 at all locations 80*a*, 80*b*, 80*c*, 80*d*, 80*e*, 80*f*, 80*g*, 80*h*, 80*j*, 80*k*, 80*l*, 80*m*, 80*n* and 80*p* using all of the apertures 59 in the segment 37 as "guides" while doing so. Next, slightly-opened-up holes 73 are formed in the segment 37 by opening up apertures 59g, 59j, 59l, 59n, 59h, 59k, 59m and 59p. The apertures at corresponding pad locations 80a, 80b, 80e, 80f, 80h, 80j, 80m and 80n are likewise opened up into holes 73. Forming holes 73 in the segment 37 and pad 33 is preferably by reaming. For example, a reaming tool is inserted downward into aperture 59g in the segment and thence into the aperture at location 80a in the pad 33 and both are opened up into slightly-larger-diameter holes 73.

Figure 10:
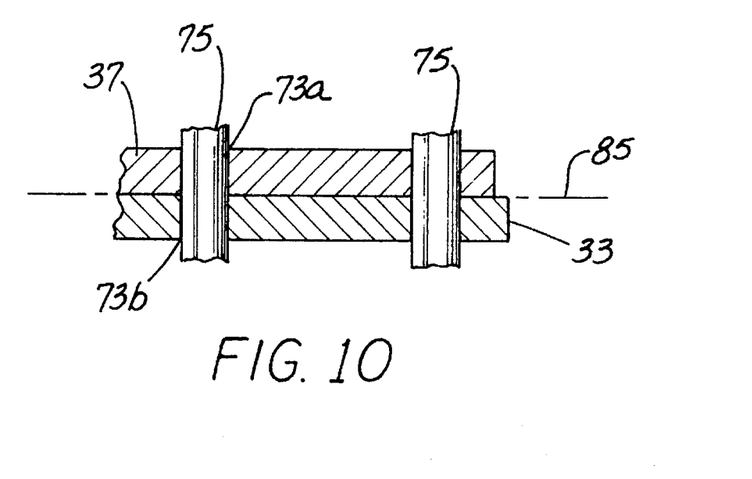
FIG. 10 is a representative cross-section side elevation view showing how bearing-fit bolts are in shear when a gear segment is attached to the mounting pad using such bolts.
Figure 11:
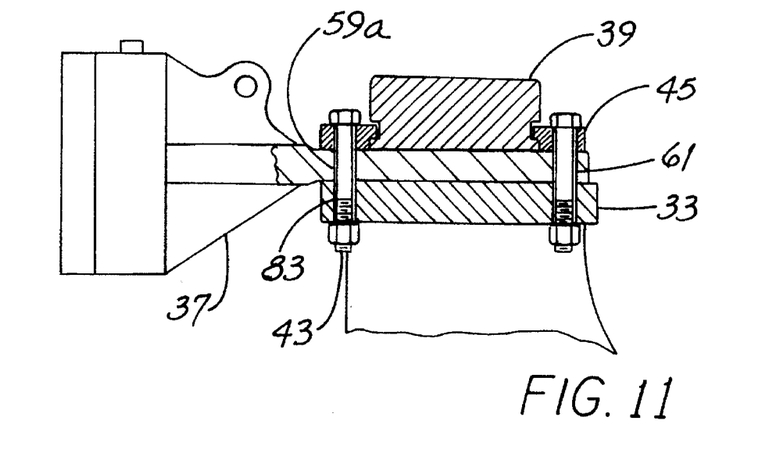
FIG. 11 is a side elevation view, partly in section, showing how the swing rail is held in place using clearance-fit bolts and retaining clips.

Assuming the gear segment 37 has not been moved after drilling and reaming, each of the holes 73 in the segment is in registry with a different hole 73 in the mounting pad 33 as shown in FIG. 12. Further, such holes 73, e.g., the hole 73 resulting from enlarging aperture 59g in the segment 37 and the corresponding hole 73 at the location 80a in the pad 33, are formed substantially simultaneously and their diameters are substantially equal to one another. As shown in FIGS. 9 and 10, a bearing-fit bolt 75 extends through both reamed holes 73 such as holes 73a, 73b. And as shown in FIG. 11, clearance-fit bolts 43 extend through apertures 59 in the gear segment 37 and in the pad 33, e.g., aperture 59a in the gear segment 37 and aperture 83 in the pad 33.

Referring particularly to FIG. 10, the bearing-fit bolts 75 are used in a way that is believed to be unique for attaching gear segments 37 to a mounting pad 33. As noted above, bolts are commonly used (and are intended to be used) as tension or clamping devices. In the invention, the bearing-fit bolts 75 are "in shear" at the plane 85. (Shear is an action or stress resulting from applied forces that urge two contiguous parts of a body—the bolt—to slide relatively to each other.)

And the invention is also useful for repair by replacing a worn gear segment 37 in a dragline 10 or similar machine having worn components at each of the first and second places 51 or 53 on the mounting pad 33. In certain aspects of the method described below, holes 73 formerly receiving a bearing-fit bolt 75 are used to receive a clearance-fit bolt 43. And new holes 73 are formed by drilling and reaming.

Referring particularly to FIG. 7, the method includes the steps of removing the worn gear segments 37 from the first and second places 51, 53. A new segment 37a is then placed at a "site" 87 (bounded by the dashed lines 89, 91) spanning the first and second places 51, 53. The new gear segment 37a is then attached at the site 87. To put it another way, the position of a new segment 37a is "indexed" slightly from a place 51 or 53 previously occupied by a worn segment 37. (It will be recalled that when new, the exemplary gear segment 37 has fourteen apertures 59. That is, prior to mounting the segment 37a, none of the apertures 59 have yet been "opened up" to holes 73.)

After initial assembly, the tub mounting pad 33 has apertures at the locations 80c, 80d, 80g, 80k, 80l and 80p, all at the first place 51. Similarly, such pad 33 has apertures at the locations 95c, 95d, 95g, 95k, 95l and 95p at the second place 53. The new, replacement gear segment 37a includes a first group of aperture 59, i.e., those apertures 59 at locations 97e, 97f, 97m and 97n and the placing step includes positioning the new segment 37a so that the apertures at such locations 97e, 97f, 97m and 97n are in registry with the apertures 59 in the pad 33 at locations 95c, 95d, 95k and 95l, respectively.

When the segment 37a is so positioned, the second group of segment apertures 59, i.e., those at locations 97c, 97d, 97k and 97l are in registry with the earlier-formed holes 73 (formed when a segment 37 was first mounted at the place 53) at locations 95a, 95b, 95h and 95j in the pad 33.

The attaching step includes reaming the apertures at the locations 97e, 97f, 97m and 97n in the segment 37a and at locations 95c, 95d, 95k and 95l, respectively. in the pad 33 to form holes 73 and extending bearing-fit bolts 75 through each "set" of holes. It is to be noted that since apertures 59 at segment locations 97c, 97d, 97k and 97l are in registry with the earlier-formed holes 73 at locations 95a, 95b, 95h and 95j in the pad 33, clearance-fit bolts 43 can be immediately inserted without further machining. For example, a clearance-fit bolt 43 can be extended through the aperture 59 at location 97c and the hole 73 (which is slightly larger than an aperture 59) at location 95a in the pad 33.

Such attaching step also includes drilling, for example, a pilot opening 71 in the pad 33 at the location 99, using the aperture 59 at the location 97a for the purpose. Similarly, pilot openings 71 are drilled in the pad 33 using the apertures 59 at the locations 97h, 97b and 97j. After such pilot openings 71 are drilled, the apertures 59 at the segment locations 97a, 97h, 97b and 97j are reamed to form holes 73 and bearing-fit bolts 73 are extended therethrough. The new segment 37a is now mounted at the site 87.

While the principles of the invention have been shown in conjuction with a specific type of machine and a specific application of the invention features, it is to be understood clearly that the machine and the application are exemplary and not limiting.

What is claimed is:

1. A method for repairing a machine having a support structure and a worn component at each of first and second places on such structure, and wherein the support structure includes plural apertures at the first place and plural apertures at the second place, the method including the steps of:

removing the worn components from the first and second places;

providing a new component having first and second groups of apertures;

placing the new component at a site spanning the first and second places by positioning the new component so that (a) at least one aperture in the first group of apertures of the new component is in registry with an aperture at the first place to thereby form a first set of apertures, and (b) at least one aperture in the second group of apertures is in registry with in aperture at the second place to thereby form a second set of apertures; and attaching the new machine component at the site.

2. The method of claim 1 wherein the attaching step includes:

reaming the first set of apertures to form a first set of coaxially-aligned holes; and extending a bearing-fit bolt through the first set of holes.

3. The method of claim 2 wherein the second set of apertures includes at least two coaxially-aligned apertures and the attaching step includes:

extending a clearance-fit bolt through the two coaxially-aligned apertures.

4. The method of claim 1 wherein the second set of apertures includes at least two coaxially-aligned apertures and the attaching step includes:

extending a clearance-fit bolt through the two coaxially-aligned apertures.

5. The method of claim 1 wherein:

the support structure includes plural holes at the first place and plural holes at the second place;

and the placing step includes:
  positioning the new component so that (a) another aperture in the first group of apertures of the new component is in registry with a hole at the first place, and (b) another aperture in the second group of apertures is in registry with a hole at the second place.

6. The method of claim 5 wherein the attaching step includes:

extending a clearance-fit bolt through that aperture in the first group and that hole at the first place which are in registry with one another; and extending a clearance-fit bolt through that aperture in the second group and that hole at the second place which are in registry with one another.

* * * * *